S. S. SWANSON.
SPREADER ARCH FOR CULTIVATORS.
APPLICATION FILED NOV. 17, 1911.
1,033,765.
Patented July 23, 1912.
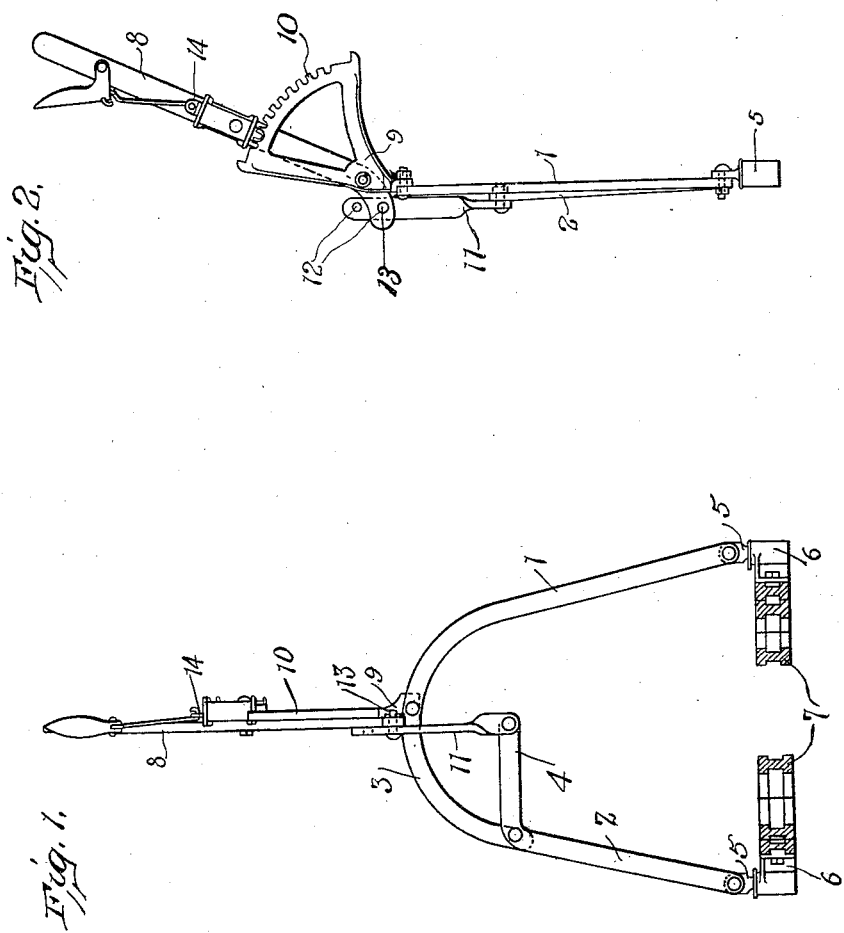
Inventor
Starley S. Swanson,
Witnesses
By Toulmin & Reed.
Attorneys

UNITED STATES PATENT OFFICE.

STARLEY S. SWANSON, OF BELLEVUE, OHIO.

SPREADER-ARCH FOR CULTIVATORS.

1,033,765. Specification of Letters Patent. Patented July 23, 1912.

Application filed November 17, 1911. Serial No. 660,796.

*To all whom it may concern:*

Be it known that I, STARLEY S. SWANSON, a citizen of the United States, residing at Bellevue, in the county of Huron and State of Ohio, have invented certain new and useful Improvements in Spreader-Arches for Cultivators, of which the following is a specification, reference being had therein to the accompanying drawing.

This invention relates to a spreader arch for a cultivator. The general purpose and character of spreaders of this kind are well known and the object of the present invention is to produce a simple and durable spreader which will impart a large amount of movement to the beams of the cultivator with a relatively small amount of movement of the actuating member.

In the accompanying drawings, Figure 1 is a front elevation of a spreader embodying my invention; and Fig. 2 is a side elevation of the same.

In these drawings I have illustrated one embodiment of my invention and have shown the same as consisting of an arch made up of two side members 1 and 2. The side member 1 is of greater length than the side member 2 and has its upper portion, 3, extending transversely to its length and curved downwardly in such a manner that the end of the transverse portion lies considerably below the top of the arch, which is formed by the transverse portion itself. The shorter side member, 2, is pivotally connected to the transverse portion of the side member 1 at a point near the end of said transverse portion and is provided with an inwardly extending portion 4 which terminates near the vertical center of the arch. In the present instance the side member 2 is substantially L-shaped and is pivoted at its elbow to the transverse portion of the side member 1. The lower ends of the side members may be connected with the beams of the cultivator in any suitable manner. As here shown pins 5 are pivotally mounted thereon and are adapted to enter sockets 6 carried by the beams 7. A lever 8 is mounted on the top of the arch and is operatively connected with the inwardly extending portion or arm 4 of the side member 2 so that the manipulation of the lever will move the side member 2 about its pivotal center and contract or spread the arch. In the present instance a bracket 9 is rigidly secured to the transverse portion of the side member 1 near the center thereof and carries a toothed segment 10 which, in the present instance, is cast integral with the bracket. The lever 8 is pivotally mounted upon the bracket 9 and the lower end of the lever which extends beyond its point of connection to the bracket is connected with the inwardly extending portion 4 of the side member 2 of the arch. Preferably, this connection is formed by means of a link 11 pivotally connected at one end to the portion 4 of the side member 2 and adjustably connected at its other end to the lever 8. This adjustable connection is preferably made by providing the link with a series of apertures 12 and connecting the same to the lever by means of a pin 13 which may be passed through any one of the apertures 12 and through the end of the lever 8. The lever is provided with the usual spring-pressed dog 14 coöperating with the toothed segment 10 to retain the lever in adjusted positions, thus enabling the amount of spread given to the beams to be controlled.

The operation of the device has been fully explained in connection with the description of the several parts of the device itself and it will be apparent that the construction of the arch is such that a comparatively small amount of movement on the part of the lever 8 will impart a large relative movement to the lower ends of the two side members of the arch and the beams to which these members are connected. Further, the device is of an exceedingly simple character and is strong and durable, thus making it not only highly efficient in its operation but of a highly durable character.

Having thus fully described my invention, what I claim as new and desire to secure by Letters Patent, is:—

1. In a spreader of the character described, a structure comprising two side members, one of said side members having a transverse upper portion to form the top of the structure, the other of said side members being pivotally mounted on the first mentioned side member, near the free end of the transverse portion thereof, and having a laterally extending portion, a lever fulcrumed on the transverse portion of the first mentioned member, a connection between said member and the laterally extending portion of the last mentioned member, and means to retain said lever in adjusted positions.

2. In a device of the character described, a structure comprising two side members, one of said side members being of greater length than the other and having its upper portion extending transversely to the side portion thereof, to form the top of the structure, and curved downwardly, the other of said side members being pivotally connected to the transverse portion of the first mentioned side member near the outer end thereof and having an inwardly extending portion, a bracket mounted on the top of the structure, a toothed segment carried by said bracket a lever mounted on said bracket and having a dog to engage said segment and a link connecting said lever to the inwardly extending portion of the last-mentioned side member.

In testimony whereof, I affix my signature in presence of two witnesses.

STARLEY S. SWANSON.

Witnesses:
  E. H. ERDRICH,
  E. A. KEMP.

---

Copies of this patent may be obtained for five cents each, by addressing the "Commissioner of Patents, Washington, D. C."